UNITED STATES PATENT OFFICE.

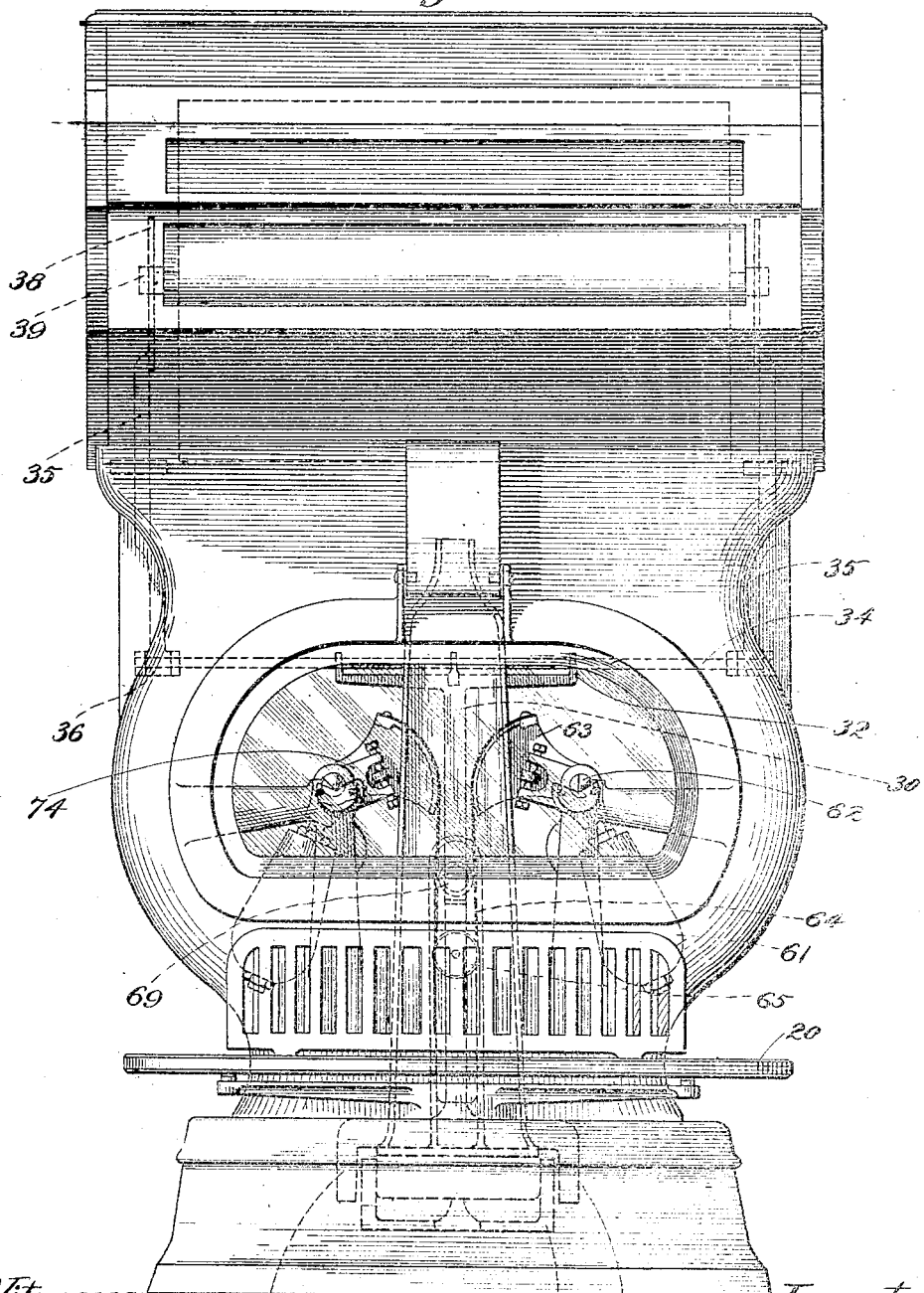

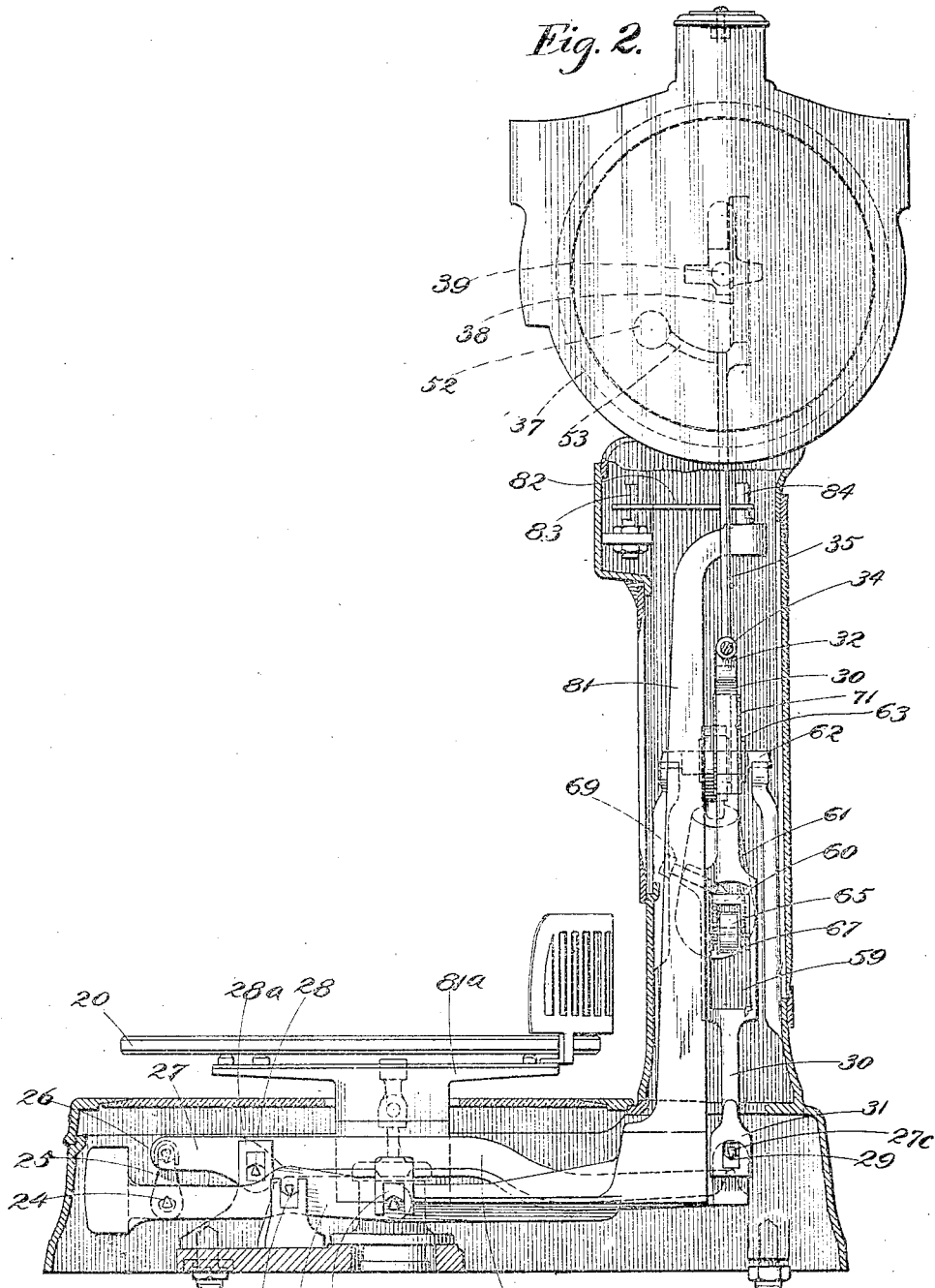

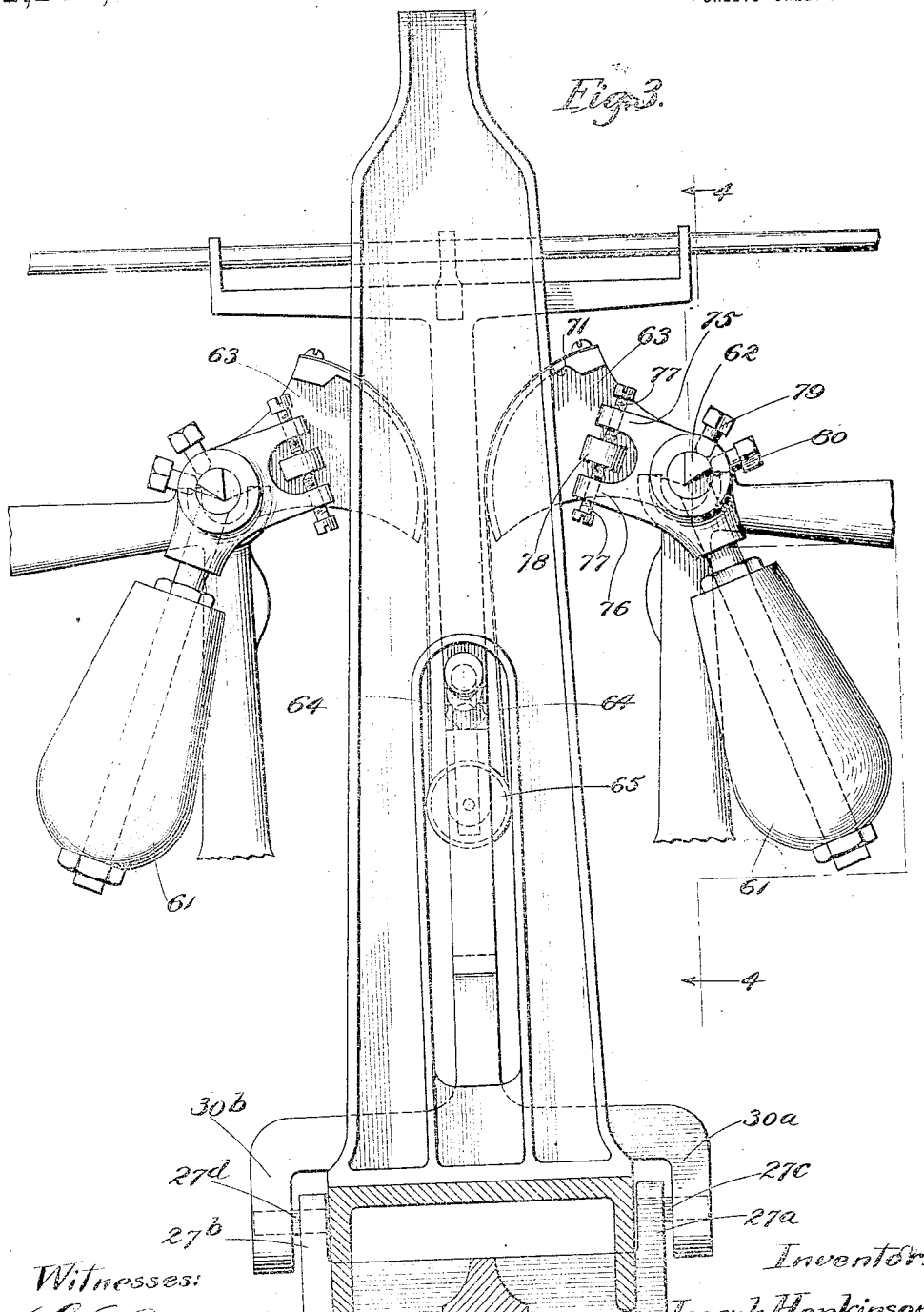

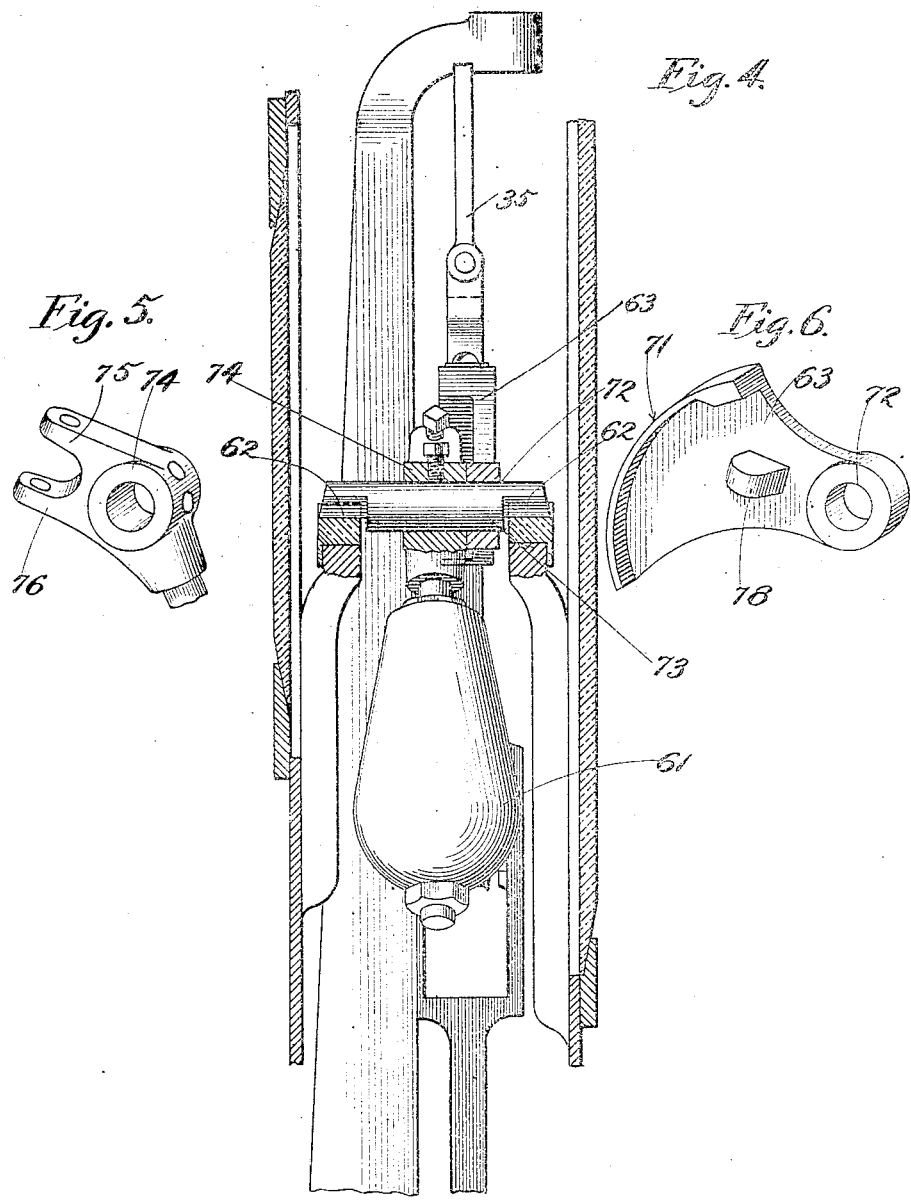

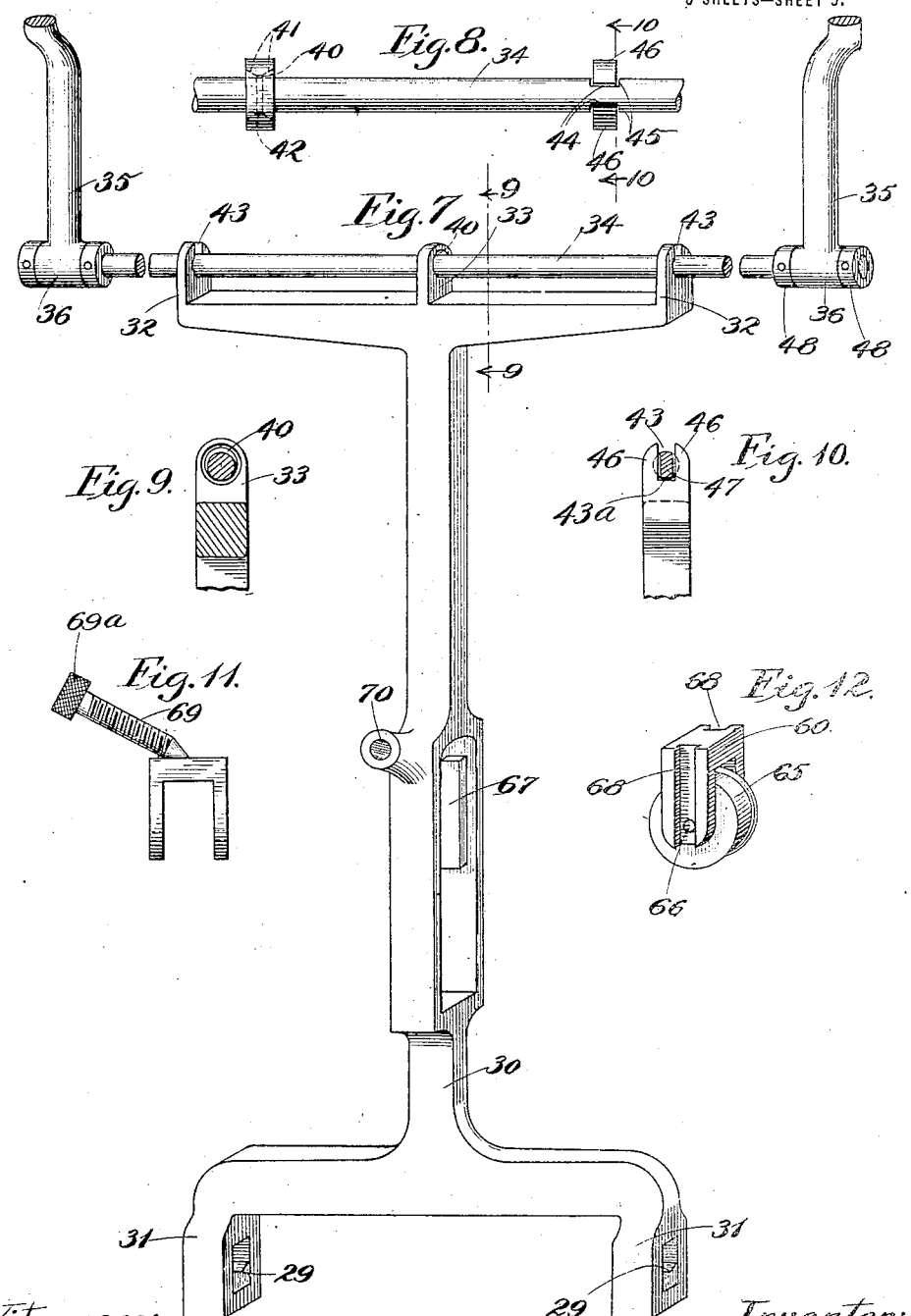

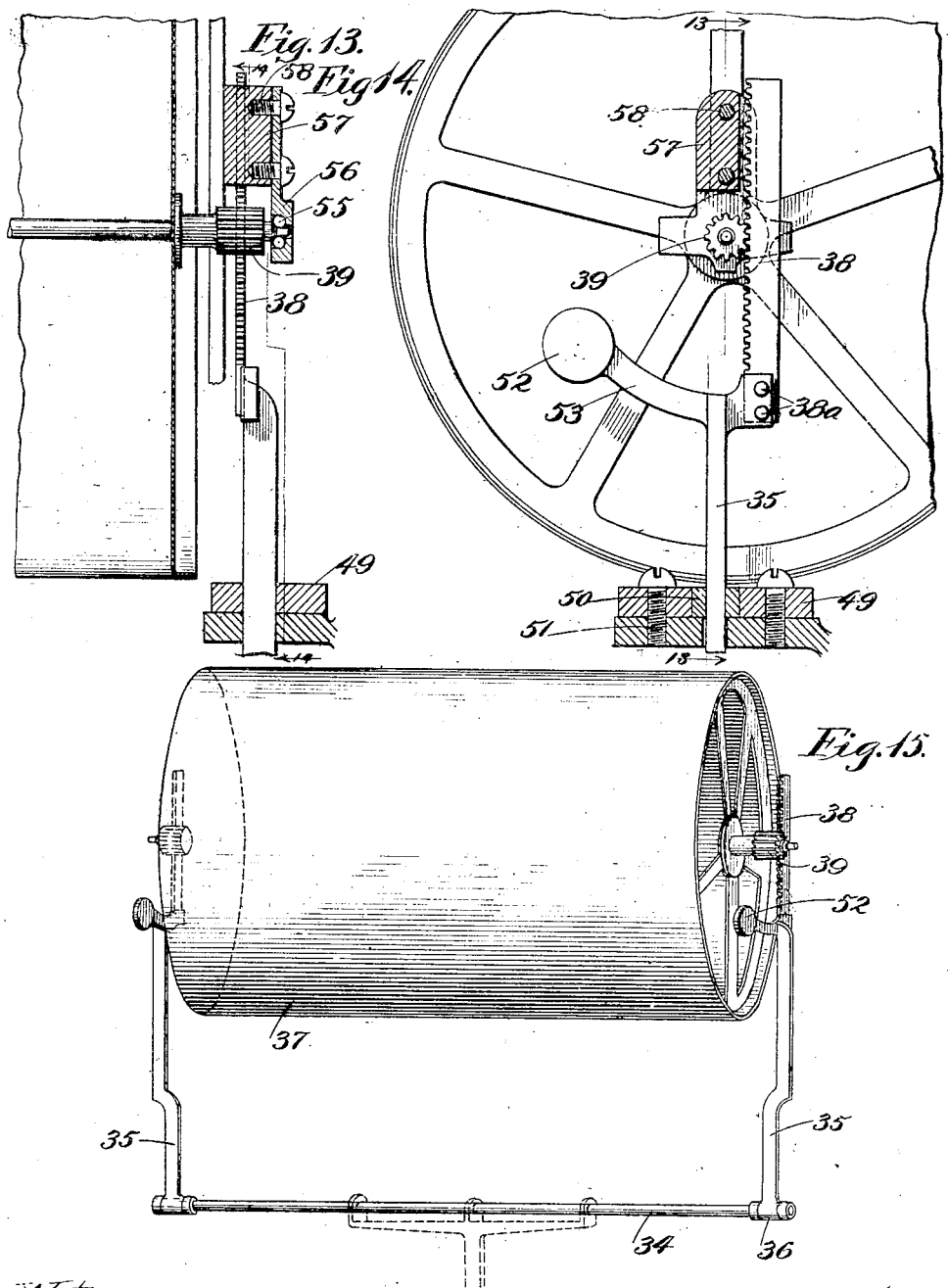

JOSEPH HOPKINSON, OF DAYTON, OHIO, ASSIGNOR TO THE COMPUTING SCALE COMPANY, OF DAYTON, OHIO, A CORPORATION OF OHIO.

COMPUTING-SCALE.

1,159,385.

Specification of Letters Patent.

Patented Nov. 9, 1915.

Application filed January 2, 1914. Serial No. 809,953.

*To all whom it may concern:*

Be it known that I, JOSEPH HOPKINSON, a citizen of the United States, residing at Dayton, in the county of Montgomery and State of Ohio, have invented certain new and useful Improvements in Computing-Scales, of which the following is a specification.

My invention relates to the class of computing scales by which the total weight and price are indicated and in which the movement of the indicating elements is resisted by pendulums suspended on knife edge bearings.

My invention comprises novel connecting devices for transmitting the motion of the platform to the indicating and computing elements. These connections comprise means for very effectively adjusting the relation of the pendulums to said indicating and computing elements. By this means the mechanism is very conveniently adjusted to zero position.

My invention also comprises means for equalizing the forces transmitted to different parts of the indicating and computing mechanism. Said means includes rack and pinion mechanism, and guides for said racks and for said equalizing means.

My invention also comprises novel improvements in the arrangement of the levers upon which the platform is supported and by which the movements thereof are transmitted to the computing and indicating mechanism.

The above and other objects of my invention will become apparent in the following specification, when taken in connection with the accompanying drawings, and the novel elements and combinations thereof will be more particularly set forth in the claims.

In the drawings—Figure 1 is a front elevation of my improved computing scale. Fig. 2 is a side elevation thereof partly in section. Fig. 3 is a front elevation of the pendulums and associated mechanism. Fig. 4 is a vertical section of the parts shown in Fig. 3 taken substantially along the line 4, 4 of Fig. 3. Fig. 5 is a perspective detail of one of the pendulum hubs. Fig. 6 is a perspective detail of one of the parts of said hub. Fig. 7 is a perspective view of a portion of the upright connecting mechanism between the platform levers and the indicating drum. Fig. 8 is a plan view of a detail of the same. Fig. 9 is a vertical section taken substantially along the line 9, 9 of Fig. 7. Fig. 10 is a vertical section of a detail taken substantially along the line 10, 10 of Fig. 8. Fig. 11 is an elevation of the adjusting screw and pulley block. Fig. 12 is a perspective view of the pulley and its carrying block. Fig. 13 is a vertical section of a portion of the machine about the rack and pinion mechanism. Fig. 14 is a sectional view taken at right-angles to the view appearing in Fig. 13, and Fig. 15 is a perspective view of the drum and rack and pinion mechanism.

My invention will be seen to comprise the usual platform 20 which is supported upon novel lever mechanism at the base of the machine, said mechanism being connected with a rotating drum 37 in the upper portion of the frame. The intermediate mechanism by which the movements of the platform and supporting levers are transmitted to said drum comprise novel adjusting mechanism, whereby the pendulums 61 are brought to the desired relation to the moving parts and the drum thus adjusted to zero position.

Referring more particularly to Figs. 1 and 2, the platform 20 will be seen to be supported by knife edge bearings 21 upon one arm of a lever 22 which extends forwardly in the base of the machine from said bearings 21 and is supported by knife edge bearings 23 which rest upon its associated fulcrum. The forward end of this lever, which I preferably call the main lever, is provided with knife edge bearings 24 which bear upwardly upon the lower portion of the vertically disposed link 25. This link in turn bears upwardly upon knife edge bearings 26 in the forward end of a lever 27 which extends backwardly in the base of the machine to the rear portion thereof. The lever 27, which I preferably call the intermediate lever, is provided with knife edge bearings 28 which bear upwardly upon its associated fulcrum 28ª fixed in the base of the machine. The lever 27 is provided with a forked rear end comprising upwardly projecting lugs 27ª and 27ᵇ in which are placed knife edge bearings 27ᶜ and 27ᵈ, as shown more particularly in Fig. 3. These bearings pivotally connect said lever with an upright bar or frame 30 having a position substantially central in the upright portion of the main frame of the machine. The upright bar or frame 30 is provided with a forked lower end comprising downwardly projecting lugs 30$^a$ and 30$^b$ to receive the knife edges 27$^c$ and 27$^b$. The upper end of this bar is also provided with forked ends 32 which carry a horizontally disposed equalizing bar or evener 34, which is pivotally connected at 36 with upright bars 35 terminating in racks 38 which actuate pinions 39 fixed to the ends of the indicating drum 37. The equalizing bar 34 is provided with a central tongue or lug 33 having an inwardly beveled aperture 41 which provides a central circular ridge 42 which bears upon said bar. The said aperture is made somewhat larger than the bar in order that there may be a clearance space 40 at the sides and top, thereby permitting the bar to rest freely upon the lower portion of said ridge 42. The upright lugs 32 are provided with rectangular notches or slots 43 at their upper ends which receive notched portions 47 of the bar. The upright lugs 46 at each side of the slot 43 fit with considerable clearance in notches in the sides of the bar, as shown at 44, 45 in Fig. 8. There is also a clearance at the bottom of the slot as shown at 43$^a$.

At the ends of the equalizing bar 34 are collars 48 fixed to the bar at each side of the eyes 36 in the lower end of the upright bars 35. The bars 35 extend upwardly through bearings 50 in bearing plates 49 secured by screws 51 to the frame of the machine. At the extreme upper end of the bar 35 and projecting considerably to one side of the bar and opposite to the rack 38 is an arm 53 carrying at its end a weight 52. Each of the racks 38 is fixed to the said bar 35 by means of rivets or other suitable fastenings 38$^a$, said racks being maintained in operative engagement with the pinion 39 by the weights 52 coöperating with the bearings 50. It will also be seen that the weights 52 cause a backward pressure to be exerted upon the equalizing bar 34 and thereby to keep the upright frame or bar 30 in its normal upright position.

The drum 37 is provided with ball bearings at the end of its shaft as shown at 55, said ball bearings being carried by a plate 56 secured by screws 58 to a part of the frame 57.

The upright bar 30 is provided with a yoke or rectangular open portion 59 in which slides a pulley block 60, which, through intervening mechanism, actuates the pendulums 61. The pendulums 61 are mounted upon knife edge bearings 62 and are provided with equalizing arms having an outer surface 71 of variable radius upon which rolls a flexible metal band 64. This flexible band passes around an equalizing pulley 65, it being attached at each end to one of said equalizing arms and adapted to roll upon it. The pulley 65 is mounted upon a pin 66 carried by the block 60, said block having grooves 68 which bear upon ribs 67 within the yoke 59. By this means the pulley is guided in a vertical direction within said yoke.

Upon the upper surface of the yoke 60 bears an adjusting screw 69 with an knurled head 69$^a$, said screw being threaded into a projecting lug 70 at such an angle that rotation of said screw will cause the block 60 to be depressed or allowed to rise as circumstances require. The pendulums 61 are so suspended and positioned with relation to their knife edge bearings 62 that they exert a constant upward tension upon the band 64, thereby causing the block 60 to be pressed upwardly against the screw 69. The screw 69 is provided with a conical end where it bears upon the block.

The equalizing arm 63 bears freely at its hub 72 upon the cylindrical body portion 73 of the knife edges 62 and is held in its proper angular relation to the pendulum 61 by the adjustable set screws 77 carried in the forked end 76 of the hub piece 74. The hub piece 74 is secured to the body portion of the knife edges by set screws 79 and 80. The set screws 77 bear upon a laterally projecting lug 78 on the equalizing arm 63.

An upright arm 81 fixed to the platform supporting member 81$^a$ carries at its upper end a post 84 which is connected by means of the link 82 with a similar post 83 secured to the main frame of the machine. The link 82 serves as a means to preserve the stability of the platform. The link 82 has a length substantially the same as the distance between the knife edge bearings 21 and the fulcrum 23 and is substantially parallel to a line joining them, whereby all movements of the platform have a parallel character, thereby providing the desired sensitiveness and accuracy of the scale.

In the operation and use of my improved scale it will be seen that when a commodity is placed upon the platform 20 a downward pressure is exerted upon the rear end of the main lever 22 and an upward pressure through the link 25 is exerted upon the forward end of the lever 27. This will produce an upward pressure upon the fulcrum 28 and a downward pressure upon the knife edge bearings 29, which is transmitted to the upright bar 30. This downward pull upon the upright bar is imparted to the horizontal equalizing bar 34 at its center and equal downward tensions are therefore exerted upon the upright bar 35. The racks 38 therefore bear with equal pressures upon the pinions 39 and the rotating drum 37 is actuated by forces at each end which are equal. The downward movement of the bar 30 causes a slight downward movement of the pulley block 60 whereupon the pulley 65 exerts a downward tension upon the two end portions of the band 64, said tensions being imparted to the equalizing arms 63 and causing the pendulums 61 to be oscillated from their normal positions and raised against the force of gravity. The variable radius of the outer surface of the equalizing arms 62 coöperating with the variable weight arms of the pendulums 61 causes the resistance to the movement of the platform to uniformly increase from its normal or zero position. The rotating drum will therefore be moved uniform distances from its zero position by uniform increments of load which are placed upon the platform. The zero position of the drum may be regulated very conveniently by means of the thumb screw 69 which bears upon the block 60. By means of this thumb screw the block 60 may be depressed or allowed to rise, as circumstances demand, whereby the precise relation between the pendulums and the drum and platform may be adjusted. The angular relation between the equalizing arms 63 and the pendulums 61 may also be adjusted by means of the set screws 77, thereby permitting the accuracy of the scale to be adjusted. The weight 52 has a tendency to cause the upright bar 35 to tip forwardly about the bearing 50 as a pivot. This tendency causes the rack 38 to be held in engagement with the pinion 39 with a constant pressure. The said weight 52 also causes the lower portion of the bearing 35 below the bearing 50 to have a constant tendency to move backwardly and thereby to maintain the upright bar 30 in a vertical position. The weight 52 will therefore be seen to effectively maintain the said parts in their normal position. The lower end of the upright member 30 is held securely in place by the knife edge bearings at the end of the lever 27 and the upper portion of said bar is guided by the bearings 50, as above described. The parts described are therefore held in their normal position by delicate forces which do not affect their sensitiveness and accuracy. It will also be seen that the equalizing bar 34 is nicely balanced upon the central lug 33 at the upper end of the bar 30 and that the rack bars 35 and racks 38 being equal in weight will actuate the indicating drum without irregular or unbalanced forces. Any slight deviation from the perfectly poised condition will be checked by the slotted lugs 32.

While I have described my invention more or less precisely as regards details of construction, I do not wish to be limited thereto unduly as I contemplate changes in the form, in the proportion of parts and in the substitution of equivalents as circumstances suggest or render expedient without departing from the spirit of my invention.

I claim:

1. In a device of the class described, a main lever, a commodity supporting element mounted on said lever at one side of its fulcrum, an intermediate lever, a link connecting the end of the main lever opposite to the commodity supporting element to the intermediate lever, a pendulum having a hub, and a flexible element connected to the hub of the pendulum and to the intermediate lever opposite said link, said flexible element being adapted to roll upon said hub, said link and said flexible element being oppositely disposed with respect to the bearing of said commodity support on said main lever.

2. In a device of the class described, a main lever, a commodity supporting element mounted on the main lever at one side of its fulcrum, an intermediate lever, a link connecting the end of the main lever opposite to the commodity supporting element to the intermediate lever, a pendulum having a hub, and a flexible element connected to the hub of the pendulum and to the end of the intermediate lever opposite said link, said flexible element being adapted to roll upon said hub, said levers being disposed adjacently and having both their fulcrums on the same side of the bearing of said commodity support on said main lever.

3. In a device of the class described, a main lever, a commodity supporting element mounted on the main lever at one side of its fulcrum, an intermediate lever, a link connecting the end of the main lever opposite to the commodity supporting element to the intermediate lever, a pendulum having a hub, and a flexible element connected to the hub of the pendulum and to the end of the intermediate lever opposite said link, said flexible element being adapted to roll upon said hub, said link and the fulcrums of both levers being on the same side of the bearing of said commodity support on said main lever.

4. In a device of the class described, a main lever, a commodity supporting element mounted on the main lever at one side of its fulcrum, an intermediate lever, a link connecting the end of the main lever opposite to the commodity supporting element to the intermediate lever, a pendulum having a hub, and a flexible element connected to the hub of the pendulum and to the end of the intermediate lever opposite said link, said flexible element being adapted to roll upon said hub, said link having a position oppositve said flexible element with respect to the bearing of said commodity support on said main lever and transmitting an upward pressure from said main lever to said intermediate lever.

5. In a device of the class described, a main lever, a commodity supporting element mounted on said lever at one side of its fulcrum, an intermediate lever, a link connecting the end of the main lever opposite to the commodity supporting element to the intermediate lever, a pendulum having a hub, and a flexible element connected to the hub of the pendulum and to the intermediate lever opposite said link, said flexible element being adapted to roll upon said hub, said link and said flexible element being oppositely disposed with respect to the bearing of said commodity support on said main lever, said hub having a face of curved form of variable radius with respect to the pivot thereof.

6. In a device of the class described, a main lever, a commodity supporting element mounted on said lever at one side of its fulcrum, an intermediate lever, a link connecting the end of the main lever opposite to the commodity supporting element to the intermediate lever, a pendulum having a hub, a flexible element connected to the hub of the pendulum and to the intermediate lever opposite said link, said flexible element being adapted to roll upon said hub, said link and said flexible element being oppositely disposed with respect to the bearing of said commodity support on said main lever, and weight and value indicating means actuated by said mechanism in opposition to the action of said pendulum.

7. In a device of the class described, a main lever, a commodity supporting element mounted on said lever at one side of its fulcrum, an intermediate lever, a link connecting the end of the main lever opposite to the commodity supporting element to the intermediate lever, a pendulum having a hub, a flexible element connected to the hub of the pendulum and to the intermediate lever opposite said link, said flexible element being adapted to roll upon said hub, said link and said flexible element being oppositely disposed with respect to the bearing of said commodity support on said main lever, weight and value indicating means actuated by said mechanism in opposition to the action of said pendulum, and means for adjusting the relation between said flexible element and said indicating means.

8. In a device of the class described, a main lever, an intermediate lever, a link connecting them at an end of each, said levers extending the same way from said link, intermediate fulcrums for said levers, a commodity supporting element pivoted on the other end of the main lever, and counterbalancing and indicating means pivotally connected to the other end of the intermediate lever.

9. In a device of the class described, a main lever, an intermediate lever, a link connecting them at an end of each, said levers extending horizontally in the same direction from said link, intermediate fulcrums for said levers, a commodity supporting element above said levers with a rigid downward extension pivoted on the other end of the main lever, counterbalancing and indicating means pivotally connected to the other end of the intermediate lever, a rigid upward extension from said commodity supporting element, and a link pivoted at its ends respectively to the upper end of the said upward extension and to a fixed point, said link being approximately parallel and equal in length to the line joining the fulcrum of the main lever to its pivotal attachment to the commodity receiving element.

10. In a device of the class described, a commodity supporting element, weight and value indicating means, means for transmitting motion from said supporting element to said weight and value indicating means, a plurality of pendulums opposing the movement of said transmitting means, a flexible element connected to said pendulums, an equalizing element bearing upon said flexible element and actuating both pendulums, and adjustable means carried by said transmitting means and engaging said equalizing element.

11. In a device of the class described, a scale lever, an upright bar pivoted at its lower end to the end of said scale lever, indicating means operatively connected to said bar at its upper end, said bar comprising a vertical guide at an intermediate part thereof directly above the end of the scale lever, a member carried by the bar adjacent to said guide, a pendulum, a flexible tape connected thereto and to said member, and means to fix said member at any desired point of adjustment along said guide and thereby fix the adjustment of the bar and the pendulum relatively to one another.

12. In a device of the class described, a scale lever, an upright bar pivoted at its lower end to the end of said scale lever, indicating means operatively connected to said bar at its upper end, a pair of pendulums, a flexible tape to each pendulum connected to said bar at an intermediate point thereof directly above the end of said scale lever, and means located at the point of connection for equalizing the tension imparted along the tapes to the respective pendulums.

13. In a device of the class described, a commodity-supporting element, a weight and value-indicating element comprising a rotating drum, a pinion at each end of said drum, racks each meshing with one of said pinions, a weight attached to each rack and adapted to press it into engagement with its pinion, rods connected at their upper ends, respectively, to said racks, a guide for each such rod, an equalizing member attached to said rods at their lower ends, and connections from said member to said supporting element.

14. In a device of the class described, a commodity-supporting element, a weight and value-indicating element comprising a rotating drum, a pinion at each end of said drum, racks each meshing with one of said pinions, a weight attached to each rack and adapted to press it into engagement with its pinion, rods connected at their upper ends respectively to said racks, a guide for each such rod, an equalizing member attached to said rods at their lower ends, connections from said member to said supporting element, and a pendulum actuated by said connections.

15. In a device of the class described, a commodity-supporting element, a weight and value-indicating element comprising a rotating drum, a pinion at each end of said drum, racks each meshing with one of said pinions, a weight attached to each rack and adapted to press it into engagement with its pinion, rods connected at their upper ends respectively to said racks, a guide for each such rod, an equalizing member attached to said rods at their lower ends, connections from said member to said supporting element, a pendulum actuated by said connections, and means for adjusting the relation between said pendulum and said connections.

16. In a device of the class described, a commodity supporting element, a weight and value indicating element, an equalizing element connected with separate parts of said indicating element and adapted to actuate said element, connections between said equalizing element and said supporting element, a plurality of pendulums, an equalizing element connected with said pendulums and adapted to actuate them with equal forces, and adjustable connections between said second named equalizing element and said supporting element.

17. In a device of the class described, a commodity supporting element, a weight and value indicating element, an equalizing element connected with separate parts of said indicating element and adapted to actuate said element, connections between said equalizing element and said supporting element, a plurality of pendulums, an equalizing element connected with said pendulums and adapted to actuate them with equal forces, connections between said second named equalizing element and said supporting element, and means for adjusting said second equalizing element and said supporting element relatively to one another.

18. In a device of the class described, a commodity-supporting element, weight and value-indicating mechanism, a pendulum, knife-edge bearings for said pendulum, a vertical bar for transmitting the movement of said supporting element to said indicating mechanism, said bar having an intermediate slot, a block in said slot, and means comprising a flexible tape connected to said block and to said pendulum for actuating the latter.

19. In a device of the class described, a commodity supporting element, lever mechanism actuated by said element, weight and value indicating mechanism, an upright member supported by said lever mechanism for transmitting motion from said lever mechanism to said indicating mechanism, said upright member having a slot therein, an adjustable block in said slot, a pulley in said block, a tape passing under said pulley, and counterbalancing means connected to the ends of said tape.

20. In a device of the class described, a commodity supporting element, lever mechanism actuated by said element, weight and value indicating mechanism, an upright member supported by said lever mechanism, a transverse member supported at its center by said upright member, connections from the end portions of said transverse member to said indicating mechanism, said upright member having a slot therein, an adjustable block in said slot, a pulley in said block, a tape passing under said pulley, and counterbalancing means connected to the ends of said tape.

21. In a device of the class described, a scale lever, an indicator, a vertical bar connecting them, said bar having a slot therein, a block in said slot, a pulley in said block, a pair of pendulums, a tape with its ends connected to said pendulums and passing under said pulley, and an adjusting screw threaded in said bar and engaging said block.

22. In a device of the class described, a commodity-supporting element, lever mechanism actuated by said element, weight and value-indicating mechanism having a plurality of pinions fixed thereto, an upright member supported by said lever mechanism, a transverse member supported at its center by said upright member, rods attached at their lower ends to the end portions of said transverse member, racks attached to the upper ends of said rods and rigid therewith and engaging said pinions, and guide bushings through which said rods pass.

23. In a device of the class described, a commodity supporting element, lever mechanism actuated by said element, weight and value indicating mechanism having a plurality of pinions fixed thereto, an upright member supported by said lever mechanism, a transverse member supported at its center by said upright member, rack members attached to the end portions of said transverse member and actuating said pinions, guides for the middle portions of said rack members, and means located above said guides for maintaining said racks in operative engagement with said pinions.

24. In a device of the class described, a scale lever, an upright bar pivoted at its lower end to the end of said scale lever, said bar having lateral extensions at its upper end, a horizontal bar loosely mounted in said extensions and extending beyond them on each side, a drum above said horizontal bar, and connections from the ends of said bar to said drum to rotate the drum by the vertical movement of the bar.

25. In a device of the class described, a scale lever, an upright bar pivoted at its lower end to the end of said scale lever, said bar having lateral extensions at its upper end, a plurality of upstanding lugs on said extensions, a horizontal bar loosely engaging said lugs and extending beyond them on each side, a drum above said horizontal bar, and connections from the ends of said bar to said drum to rotate the drum by the vertical movement of the bar.

26. In a device of the class described, a scale lever, an upright bar pivoted at its lower end to the end of said scale lever, said bar having lateral extensions at its upper end, upstanding notched lugs on the ends of said extensions, another upstanding lug with a hole therethrough directly above the bar between said extensions, a horizontal bar loosely mounted in the respective notches and hole of all said lugs and extending beyond them on each side, a drum above said horizontal bar, and connections from the ends of said bar to said drum to rotate the drum by the vertical movement of the bar.

27. In a device of the class described, a scale lever, an upright bar pivoted at its lower end to the end of said scale lever, said bar having lateral extensions at its upper end, a horizontal bar loosely mounted in said extensions and extending beyond them on each side, a drum above said horizontal bar, gear pinions on the ends of said drum, rack rods from the ends of said horizontal bar to said gear pinions, and guides for said rack rods.

In testimony whereof, I have subscribed my name.

JOSEPH HOPKINSON.

Witnesses:
 JOSEPH WALES,
 EDW. G. FREED.